United States Patent
Sergeev

(10) Patent No.: US 11,414,953 B2
(45) Date of Patent: Aug. 16, 2022

(54) METHOD FOR KILLING OIL AND GAS WELLS

(71) Applicant: LIMITED LIABILITY COMPANY "GR PETROLEUM", Moscow (RU)

(72) Inventor: Vitalii Vyacheslavovich Sergeev, Moscow (RU)

(73) Assignee: LIMITED LIABILITY COMPANY "GR PETROLEUM", Moscow (RU)

(*) Notice: Subject to any disclaimer, the term of this patent is extended or adjusted under 35 U.S.C. 154(b) by 259 days.

(21) Appl. No.: 16/639,601

(22) PCT Filed: Aug. 23, 2018

(86) PCT No.: PCT/RU2018/050103
§ 371 (c)(1),
(2) Date: Feb. 17, 2020

(87) PCT Pub. No.: WO2019/039974
PCT Pub. Date: Feb. 28, 2019

(65) Prior Publication Data
US 2021/0017832 A1    Jan. 21, 2021

(30) Foreign Application Priority Data
Aug. 21, 2017   (RU) .......................... RU2017129595

(51) Int. Cl.
*C09K 8/42* (2006.01)
*E21B 33/138* (2006.01)
(Continued)

(52) U.S. Cl.
CPC ............... *E21B 33/12* (2013.01); *C09K 8/36* (2013.01); *C09K 8/42* (2013.01); *C09K 8/426* (2013.01);
(Continued)

(58) Field of Classification Search
CPC ..... E21B 33/138; C09K 8/42; C09K 2208/10; C01B 33/14
See application file for complete search history.

(56) References Cited

U.S. PATENT DOCUMENTS 3,060,210 A * 10/1962 De Groote .............. C10L 1/221
507/244
2016/0017204 A1    1/2016 Hill et al.
(Continued)

FOREIGN PATENT DOCUMENTS

RU         2257462 C1    7/2006
RU         2279462 C1    7/2006
(Continued)

*Primary Examiner* — Catherine Loikith
(74) *Attorney, Agent, or Firm* — Nixon & Vanderhye PC

(57) ABSTRACT

The technology includes consecutively pumping an active pack and a displacement fluid into the near-wellbore region of a formation. The active pack is an emulsion system. The displacement fluid is an aqueous solution of calcium chloride or potassium chloride to which 1-2 vol % of IVV-1 or ChAS-M brand water repellent is added. Technical results include greater efficiency of geological and engineering operations involved in the killing of oil and gas wells, high heat stability and aggregate stability of the emulsion system for killing wells, and also the possibility of adjusting the viscosity properties of the emulsion system according to the porosity and permeability characteristics and the geological and physical characteristics of the near-wellbore region of a formation.

1 Claim, 3 Drawing Sheets

| Dies. fuel | Emulsifier | ES structure, % by vol. | | Density, kg/m³ |
| | | Colloidal solution of nanoparticles | Aqueous solution of calcium chloride | |
|---|---|---|---|---|
| 15 | 2 | 0.5 | 82.5 | 1180 |
| 15 | 2 | 0.5 | 82.5 | 1183 |
| 20 | 2.5 | 0.7 | 76.8 | 1171 |
| 25 | 2.5 | 0.7 | 76.8 | 1166 |
| 28 | 3 | 1 | 68 | 1142 |
| 30 | 3 | 1 | 68 | 1095 |

(51) Int. Cl.
    *C01B 33/14*     (2006.01)
    *E21B 33/12*     (2006.01)
    *C09K 8/36*      (2006.01)
    *C09K 8/92*      (2006.01)

(52) U.S. Cl.
    CPC .............. *C09K 8/92* (2013.01); *E21B 33/138* (2013.01); *C01B 33/14* (2013.01); *C01P 2004/64* (2013.01); *C09K 2208/10* (2013.01)

(56) References Cited

U.S. PATENT DOCUMENTS

2017/0088762 A1    3/2017  Zhang et al.
2021/0254444 A1*   8/2021  Sergeev ................ C09K 8/602

FOREIGN PATENT DOCUMENTS

| RU | 2357997 C1 | 6/2009 |
| RU | 2441975 C1 | 2/2012 |
| WO | 2017058492 A1 | 4/2017 |

\* cited by examiner

| NO. | Special machinery and equipment | UM | Quantity, pcs. | Purpose |
|---|---|---|---|---|
| 1 | BPS with external pump and paddle stirrer | pieces | 1 | AP preparation |
| 2 | Line (tubes, hoses) | set | 1 | Filling and draining of water, AP |
| 3 | CA-320 (ЦА-320) cementing unit | pieces | 1 | AP pumping, injection into the well |
| 4 | Road tank truck | pieces | 2 | For transportation of technological liquids |
| 5 | Process tank (25 m$^3$) | pieces | 1 | Storage of technological liquids |
| 6 | Gauge staff | pieces | 1 | Measuring the AP volume |
| 7 | Specific-gravity hydrometer | pieces | 1 | Measurement of density of liquids |

Fig. 1

| ES structure, % by vol. | | | | Density, kg/m$^3$ |
|---|---|---|---|---|
| Dies. fuel | Emulsifier | Colloidal solution of nanoparticles | Aqueous solution of calcium chloride | |
| 15 | 2 | 0.5 | 82.5 | 1180 |
| 15 | 2 | 0.5 | 82.5 | 1183 |
| 20 | 2.5 | 0.7 | 76.8 | 1171 |
| 25 | 2.5 | 0.7 | 76.8 | 1166 |
| 28 | 3 | 1 | 68 | 1142 |
| 30 | 3 | 1 | 68 | 1095 |

Fig. 2

| Dies. fuel | ES compound,% by vol. | | | Density, kg/m³ |
|---|---|---|---|---|
| | Emulsifier | Colloidal solution of nanoparticles | Aqueous solution of potassium chloride | |
| 15 | 2 | 0.5 | 82.5 | 1067 |
| 15 | 2 | 0.5 | 82.5 | 1063 |
| 20 | 2.5 | 0.7 | 76.8 | 1043 |
| 25 | 2.5 | 0.7 | 76.8 | 1030 |
| 28 | 3 | 1 | 68 | 1033 |
| 30 | 3 | 1 | 68 | 1005 |

Fig. 3

| Dies. fuel | ES compound,% by vol. | | | Electrostability, V |
|---|---|---|---|---|
| | Emulsifier | Colloidal solution of nanoparticles | Aqueous solution of calcium chloride | |
| 15 | 2 | 0.5 | 82.5 | 131 |
| 15 | 2 | 0.5 | 82.5 | 134 |
| 20 | 2.5 | 0.7 | 76.8 | 140 |
| 25 | 2.5 | 0.7 | 76.8 | 165 |
| 28 | 3 | 1 | 68 | 156 |
| 30 | 3 | 1 | 68 | 169 |

Fig. 4

| | ES compound,% by vol. | | | Kinematic viscosity, mm²/s |
|---|---|---|---|---|
| Dies. fuel | Emulsifier | Colloidal solution of nanoparticles | Aqueous solution of calcium chloride | |
| 15 | 2 | 0.5 | 82.5 | 10.6 |
| 15 | 2 | 0.5 | 82.5 | 9.1 |
| 20 | 2.5 | 0.7 | 76.8 | 8.7 |
| 25 | 2.5 | 0.7 | 76.8 | 8.2 |
| 28 | 3 | 1 | 68 | 8.0 |
| 30 | 3 | 1 | 68 | 7.9 |

Fig. 5

METHOD FOR KILLING OIL AND GAS WELLS

This application is the U.S. National Phase of PCT/RU2018/050103 filed on Aug. 23, 2018, which claims priority to RU 2017129595 filed on Aug. 21, 2017, the entire contents of each of which are hereby incorporated herein by reference.

FIELD OF THE INVENTION

The invention relates to oil and gas producing industry, namely to the technologies for killing of oil and gas wells.

BACKGROUND

The term "killing" means a set of sequential technological operations aimed at temporarily stopping the inflow of fluids from the formation into the well by creating with technological compounds a backpressure on the formation.

Currently, a significant part of oil and gas fields are at the stage of declining production or final stage of development. Natural wear and tear of wells structures and underground equipment leads to reduction in overhaul life, increase in unscheduled repairs of wells and the introduction of a large number of geological and technical measures, during which it is necessary to engage teams for production maintenance and workover of wells for well killing operations.

In accordance with applicable requirements for occupational safety and health in repair of oil and gas wells, wells with reservoir pressure higher than hydrostatic and wells with reservoir pressure below hydrostatic, but in which the conditions for flowing or showing of gas and oil are maintained, are to be killed.

Experience has shown that in most cases after killing the well with the use of water-based process liquids, the deterioration of the filtration-capacitance parameters of the bottom-hole formation zone (BHZ) is observed, which in turn has a negative effect on the well operation efficiency.

The main reasons for the deterioration of the filter and capacitance parameters of BHZ are:
- swelling of clayey components of reservoir formations as a result of hydration;
- blocking effect of water caused by capillary and surface phenomena occurring in the pore space as a result of mutual displacement of immiscible liquids;
- formation in the pore space of insoluble precipitates as a result of interaction of filtrates and formation fluids;
- clogging of pores with solid particles penetrated into the formation together with the filtrate;
- clogging of pores with sediments of highly mineralized aqueous solutions as a result of precipitation in pore channels of salts in crystalline form;
- reducing the phase permeability of BHZ for oil as a result of the action of aqueous solutions on the rock surface.

The degree of manifestation of these processes depends on a variety of factors affecting the formation system, including geological-physical and lithologic-facies conditions of the formation, physico-chemical properties of the formation fluids, operating mode of the well, and technological conditions of the well killing.

The hydrophilization of pore channel surface, formation of insoluble precipitations, and swelling of clay particles contained in the BHZ are some of the main factors that have a negative effect on filtration-capacitive parameters of the BHZ as a result of the well killing.

To prevent the negative impact of water solutions on the formation system of the BHZ during the killing of wells, it is necessary to use active technological compounds in the form of spacers that ensure the preservation or improvement of the filtration-capacitive properties of the BHZ and reduction of phase permeability of rocks by water.

Active compounds used as buffer spacers prevent the interaction of aqueous solutions of salts with the BHZ formation system. The ability of active compounds to hydrophobize the surface of rocks ensures a reduction in water cut in well production and reduction in the duration of technological operations to develop and bring the well to stable production.

From patent application US 2016/0017204 (published on Jan. 21, 2016), a method for preparing an emulsion for treating of oil and gas wells is known. The emulsion contains oil, plurality of hydrophobic silica nanoparticles, aqueous salt solution. The disadvantage of the process is that the emulsion may contain an aqueous phase in the ranges of 1 to 95% by volume, which is not technically feasible, since with an aqueous phase content of more than 85% by volume, the emulsion is characterized by high dynamic viscosity and an increased yield value. Increased viscosity characteristics of the emulsion lead to failure of pumping machines when pumping in and emergency situations associated with exceeding the allowable pump-in pressure on the processing line. Also, the decrease in volume water content in the emulsion below 65% by volume will lead to the emulsion stratification into phase components, i.e. loss of system stability and loss of technological properties.

From the patent application US 2017/088762 A1 (published on Mar. 30, 2017) there is known a method for preparing a saline solution with a content of silicone dioxide nanoparticles. The method is aimed at reducing the temperature of salt crystallization in high-density aqueous solutions, which are used at drilling and completion of oil and gas wells. The disadvantage of the method is that the use of salt solutions on water basis with a high density during at initial opening of oil-and-gas bearing reservoirs negatively affects the phase permeability of the formation by oil and gas. The method does not involve preventing the contact of water-based process compounds with oil-gas-saturated porous medium.

From the patent WO 2016/196332 A1 (published on Dec. 8, 2016) there is known a method for preparing a saline solution with a content of nanoparticles of various minerals. The method is aimed at reducing the temperature of salt crystallization in high-density aqueous solutions, which are used at drilling and completion of oil and gas wells. The method involves the use of aqueous solution of high density with the content of nanoparticles of various minerals as the internal phase of the emulsion. The disadvantage of the method is that the use of an aqueous component with a high density in emulsion will result an increase in the emulsion density, which is a negative factor at the passage of absorbing intervals during drilling and completion of the wells, because it leads to absorption of the emulsion by receiving intervals and loss of control of the drilling process.

From SU No. 1629501 (published on Feb. 23, 1991) it is known a method of killing the well. The method provides for sequential injection of three compositions into the bottom-hole formation zone: aqueous solution of a surface acting agent (SAA), invert emulsion and well-killing fluid. The disadvantage of the method is that it does not provide for prevention of the interaction of water-based solutions with the formation system. When the aqueous solution is injected into the bottom-hole formation zone, despite the presence of surfactants in its formulation, the phase interacting with the oil-gas-saturated porous medium will be the water. In this connection, the subsequent injection of invert-emulsion slurry will not perform the function of the active pack, but will only limit the penetration of the next slurry of aqueous solution into the bottom-hole formation zone.

From the patent RU No. 2348799 (published on Mar. 10, 2009) it is known a method for killing gas wells, including sequential injection of three compositions into the bottom-hole formation zone—well-killing fluid, blocking fluid and displacement fluid. In this case, diesel fuel or condensate, emulsifier, chalk with asbestos, and aqueous solution of calcium chloride are used as the blocking fluid. The disadvantage of the method is that after killing the well by the composition with chalk, asbestos and carboxymethylcellulose, it is necessary to perform an additional geological and technical measure—acid treatment, which is aimed at cleaning the bottom-hole formation zone from chalk and asbestos.

From the patent RU No. 2184839 (published on Jul. 10, 2002) it is known a method for preparing a composition for killing wells. The composition includes diesel fuel or oil, emulsifier, hydrophobic chemically modified silica and aqueous solution of calcium chloride or potassium chloride. The disadvantage of the method is that the addition of chemically modified silica does not change the phase permeability of the surface of pore channels, but only increases the stability of the emulsion-suspension system.

From the patent RU No. 2357997 (published on June, 2009) it is known a method for preparing a blocking fluid for killing wells. The blocking liquid contains diesel fuel or oil, emulsifier, organophilic clay, aqueous solution of calcium chloride or potassium chloride, filtration regulator and hydrophobizator (oil-wetting agent) ABR (АБP). The disadvantage of the method is presence in the composition of particles of organophilic clay and chalk, because these solid particles are completely insoluble in water or hydrocarbons and will be the co-mantles of pore channels, reducing the permeability of rocks.

From patent WO2017058492 (published on Apr. 6, 2017) it is known a method for preparing a composition for killing wells. The composition includes diesel fuel or oil, solid particles of hydrophobic colloidal silica, organophilic clay, bentonite or other clay particles and saline solution. The disadvantage of the method is the presence in the composition of solid particles of organophilic clay, bentonite, which reduce the permeability of rocks in the bottom-hole formation zone and adversely affect the phase permeability of rocks by oil.

From the patent RU No. 2279462 (published on Jul. 10, 2006) it is known a method for preparing a composition for killing wells containing hydrocarbons, emulsifier, emulsion of polymer, highly disperse hydrophobic materials of silicon oxides and aqueous solution of calcium chloride or potassium chloride. The disadvantage of the method is the presence in the composition of polymer emulsion (up to 5% by volume), which is not soluble in the reservoir conditions and is a synthetic colmatant (bridging agent) of porous medium.

SUMMARY OF THE INVENTION

To solve the above problems in the development of oil and gas fields, a method for killing oil and gas wells is proposed, based on the sequential injection of emulsion system (ES) into the BHZ with colloidal solution of hydrophobic nanoparticles of silicone dioxide and aqueous solution of calcium chloride or potassium chloride with a hydrophobizator content of 1-2% by volume.

The essence of the invention is sequential injection of an active pack and displacement fluid into the bottom-hole formation zone, while an emulsion system containing (% by volume) is used as the active pack: diesel fuel or treated oil from an oil preparation and pumping station—15-30, emulsifier—2-3, colloidal solution of hydrophobic silicon dioxide nanoparticles—0.5-1, and aqueous solution of calcium chloride or potassium chloride—the rest, and as displacement fluid is used an aqueous solution of calcium chloride or potassium chloride with the addition of hydrophobizator (oil-wetting agent) of "IVV-1" (ИBB-1) or "ChAS-M" (ЧC-M) brands of 1-2% by volume. In addition to the above, colloidal solution of hydrophobic silicon dioxide nanoparticles may contain, % by volume: amorphous silicon dioxide—30-32.5, propyleneglycol monomethyl ether—67-69, water—the rest. A composition of the following formulation may be used as an emulsifier (% by volume): esters of higher unsaturated fatty acids (linoleic, oleic, linolenic) and resin acids—40-42, amine oxide—0.7-1, high molecular weight organic heat stabilizer—0.5-1, diesel fuel (summer or winter)—the rest. At this quality of the high-molecular organic heat stabilizer, it is used a suspension of lime or bentonite in diesel fuel (% by volume): diesel fuel—45%, lime or bentonit—55%.

Hydrophobizator "IVV-1" (ИBB-1) is produced according to TU 2482-111-56856807-2016 specification and is a mixture of alkyl dimethylbenzylammonium chloride and a tertiary amine quaternary ammonium salt, obtained by condensation of alkyl dimethylamine and benzyl chloride.

Hydrophobizator "CHAS-M" (ЧAC-M) is produced according to TU 20.41.20-125-56856807-2017 specification and is a water-alcohol solution of quaternary ammonium salts of alkyl dimethylamine.

The technical result of the invention is an increased effectiveness of geological and technical operations for killing oil and gas wells, high thermal stability and aggregative stability of the emulsion system for killing wells, as well as the ability to regulate the surface-active properties and viscosity of the emulsion system depending on the filtration-capacitive and geological-physical characteristics of bottom-hole formation zone.

BRIEF DESCRIPTION OF THE DRAWINGS

The invention is illustrated by the following figures.

FIG. 1 is a table showing a method and equipment for preparation and injection of the active pack.

FIG. 2 is a table showing the results of measuring the density of ES (emulsion system) with a density of the water component of 1200 kg/m$^3$.

FIG. 3 is a table showing the results of measuring the density of ES with a density of the water component of 1100 kg/m$^3$.

FIG. 4 is a table showing the results of measuring the aggregative stability (electrical stability) of the ES with a density of the water component of 1200 kg/m$^3$.

FIG. 5 is a table showing the results of measuring the kinematic viscosity of the ES with a density of the water component of 1200 kg/m$^3$.

DETAILED DESCRIPTION OF THE INVENTION

The use of emulsion system (ES) with the content of a colloidal solution of hydrophobic silicon dioxide nanoparticles as an active pack eliminates negative factors that can be caused by use of a traditional method of killing wells by aqueous solutions.

The inventive ES in the form of an active pack (AP) prevents the interaction of a water-based well-killing fluid with the formation system of BHZ during well killing operation. When filtration of ES into pore channels and cracks of BHZ, their hydrophobization takes place, which leads to decrease in rate of impregnation of rock with water-based process liquids during killing, as well as during development, process stabilization and operation of well.

The content of colloidal solution of hydrophobic silicon dioxide nanoparticles in the ES provides:
the possibility of regulating the rheological properties of ES in a wide range by changing the volume content of the colloidal solution of nanoparticles in the system;
increase in ES stability;
change in the boundary angle of selective wetting of rocks, achieved due to the surface activity of nanoparticles.

When the ES moves in a porous medium, its effective viscosity depends on the volume water content in the system and the rate of its filtration in a porous medium, increasing with enhancement of water content and decreasing the filtration rate. This leads to the fact that when the ES moves in a porous medium self-regulation of viscosity properties, speed and direction of filtration are taking place into the BHZ. These physical properties of the ES make it possible to form a one-piece screen in the BHZ, which mainly penetrates into the most permeable operating intervals of the BHZ.

The invention provides an increase in the efficiency of geological and technical operations for killing oil and gas wells.

Preparation of Active Pack

Preparation of the active pack (AP) is performed at solution preparation unit: block for preparation of solutions "BPS" (БПР/BPR) (mixer with a stirrer and an external centrifugal pump). The necessary equipment for preparation and injection of the active pack into the well is presented in the table in FIG. 1.

Diesel fuel or treated oil from an oil preparation and pumping station of 15-30% by volume should be collected in a tank for preparation of AP. Next, the centrifugal circulation pump and a paddle mixer are started. After this, an emulsifier—2-3% by volume, a colloidal solution of silicon dioxide nanoparticles—0.5-1% by volume, and an aqueous solution of calcium chloride or potassium chloride as the rest, are gradually dispersed in hydrocarbon phase.

A composition of the following formulation may be used as an emulsifier (% by volume): esters of higher unsaturated fatty acids (linoleic, oleic, linolenic) and resin acids—40-42, amine oxide—0.7-1, high molecular weight organic heat stabilizer—0.5-1, diesel fuel (summer or winter)—the rest.

As a colloidal solution of silicon dioxide nanoparticles may be used a composition containing, % by vol.: amorphous silicon dioxide—30-32.5, propyleneglycol monomethyl ether—67-69, water—the rest.

The input of the AP components into the hydrocarbon base is performed through the ejector using a vacuum hose.

Process tanks should be equipped with paddle stirrers, which ensure a constant and uniform distribution of reagents throughout the volume. It is recommended to use blade-paddle stirrers with reversing direction of rotation to ensure obtaining and maintaining stable properties of AP.

Quality of preparation and stability properties of the AP depends on the completeness of coverage by mixing the entire volume of the process tank, purity of the tanks, the speed of entering the components and the time of dispersion. It is recommended to use a tank with "bevelled" corners (a shape close to cylindrical).

Quality Control of Active Pack Preparation

The control is carried out by testing the AP sedimentation stability. The test is considered positive if, during the exposure of the ES at room temperature for 2 hours, the aqueous phase is separated at not more than 2% of the total volume of the ES.

Calculation of Active Pack Volume

The AP volume, (V), $m^3$ is determined by the volumes of opened perforation interval, well sump and safety margin, according to the formula:

$$V=(h_{cb}-h_{up}+h_{mrg})*V_{sp}+0.0007*h_{st}+V_{flush}, m^3 \quad (1)$$

where:
$h_{cb}$—level of current bottom-hole, m;
$h_{up}$—level of upper mark of the perforation interval, m;
$h_{mrg}$—level of safe margin, m (with a production column less than 500 m in depth≈25 meters);
$V_{sp}$—specific internal volume of casing string, $m^3$ per 1 l. meter;
0.0007 is the coefficient of AP consumption for wetting of tube walls;
$h_{st}$—tubing string setting depth;
$V_{flush}$—volume of AP overflush, $m^3$.

Volume of AP overflush $V_{flush}$ should be determined by the following formula:

$$V_{flush}=1/K_a+0.2*(h_{opn})^{1/2}, m^3, \quad (2)$$

where:
$h_{opn}$—opened-up perforation zone, m
$K_a$ is a coefficient of anomalousness, where $K_a=R_{res}/RH_{hydrst}$, where $P_{res}$ means reservoir pressure, and $P_{hydrst}$ means hydrostatic pressure.

Criteria for calculating the level of safe margin $h_{mrg}$—upper limit of the AP installation (for casing string depth of more than 500 m):

At the presence of a suspension of the electric submersible pump (ESP), the AP is installed from the bottom-hole to an interval 50 m above the upper perforations, but below the pump intake by 50 m:

$$h=(h_{up}+50 \text{ m})-h_{cb} \quad (3)$$

where:
$h_{up}$—level of top perforations, m;
$h_{cb}$—level of current bottom-hole, m;

If there is a packer device, the AP is installed from the current bottom-hole to the packer installation interval:

$$h=(h_{pack}-h_{cb}), \quad (4)$$

where:
$h_{pack}$—level of a packer device installation, m;
$h_{cb}$—level of current bottom-hole, m;

When using coiled tubing (CT) with a packer device, the AP is installed from the current bottom-hole to the packer installation interval in the same way as formula 4.

When using coiled tubing without packer, the AP is installed up from the bottom-hole to the interval being 50 m above the upper holes of perforation:

$$h=(h_{up}+50 \text{ m})-h_{cb}, \tag{5}$$

where:

$h_{up}$—level of top holes of perforation, m;
$h_{cb}$—level of current bottom-hole, m;

The excess volume of AP for wetting the walls is determined on the basis of the minimum norm in 1 m³ per well, the estimated AP consumption for wetting is 0.7 dm³/1 meter of passed down tubes. The upper limit of the AP installation should be not less than 50 m lower than the intake of the downhole pumping equipment (DPE) to ensure circulation at the well equilibration during the well-killing process.

Installation of Active Pack

Installation of AP is performed by standard methods: "direct injection" or "reverse injection", depending on the availability, type of underground equipment and design features. The method of "reverse injection" through annular space is preferred.

It is not recommended to perform well-killing with "direct injection" at the presence of lowered into the well electric submersible pump (ESP) or sucker-rod pump (SRP) due to the risk of breakage of the column with an increase in pressure when the AP is displaced through the hole of the knock-off valve.

In the presence of leakage of the casing string, a method of "direct injection" with a maximum allowable pressure of 35 atm per tubing string with downhole pumping equipment (DPE) is a possible way of installing the AP.

Emulsion system with these components is not designed for killing wells with leakage of the casing string.

Installing of AP by Direct Injection:

1) The Volume of AP is Less than the Volume of Tubing

The first stage is the injection of AP into the tubing up to the bottom of the tubing (pump suspension) on circulation with an open annular valve.

The active pack is pumped into the tubing in the volume of the tubing empty space and is moved to the tubing bottom (funnel cut) by the well-killing fluid circulating in the volume:

$$V_{(circ)}=V_{(tub)}-V_{(rod)}-V_{(AS)} \tag{6}$$

where:

$V_{(circ)}$—volume of well-killing fluid, injected at open annular valve, to move the AP to the tubing bottom, m³;
$V_{(tub)}$—internal volume of tubing, m³;
$V_{(rod)}$—displacement of drill-rods, m³; (when ESP $V_{(rod)}$=0);
$V_{(AS)}$—volume of active pack, m³.

The second stage is overflush of AP at the annular valve closed by well-killing fluid in the volume:

$$V_{(flush)}=0.001*V_{(c.spec)}*(h_{(c.b.)}-h_{(tub)})-V_{(AS)}+1=V_{(well\ under\ DPE)}-V_{(AP)}+1 \tag{7}$$

where:

$V_{(flush)}$—volume of well-killing fluid, injected at closed annular valve (to annular valve), m³;
0.001—dm3 (l) into m³ recalculation factor;
$V_{(c.spec)}$—specific internal volume of casing under DPE, dm³/m,
$h_{(tub)}$—of pump or tubing suspension, m;
$h_{(c.b.)}$—depth of the current bottom-hole, m;
$V_{(AP)}$—volume of active pack, m³;
$V_{(well\ under\ DPE)}$—volume of well under DPE, m³;
1—reserve of volume of well-killing fluid for AP overflush, m³.

1) The Volume of AP is Larger than the Volume of Tubing

The first stage is the injection of AP into the tubing in the volume of empty tubing space (up to pump suspension) on circulation with an open annular valve for displacement.

$$V_{(AP\text{-}circ)}=V_{(tub)}-V_{(rod)} \tag{8}$$

where:

$V_{(AP\text{-}circ)}$—volume of active pack, injected at closed annular valve, m³;
$V_{(tub)}$—internal volume of tubing, m³;
$V_{(rod)}$—displacement of drill-rods, m³; (when ESP $V_{(rod)}$=0);

The second stage is the injection of the remaining volume of AP and its overflush at closed annular valve by well-killing fluid in the volume:

$$V_{(flush)}=V_{(tub)}-V_{(rod)}+V_{(well\ under\ DPE)}-V_{(AP)}+1 \tag{9}$$

$$V_{(flush)}=0.001*V_{(tub.spec)}*h_{(tub)}-V_{(rod)}+0.001*V_{(c.spec)}*(h_{(c.b.)}-h_{(tub)})-V_{(AP)}+1 \tag{10}$$

where:

$V_{(flush)}$—volume of well-killing fluid, injected for overflush at closed annular valve, m³;
0.001—dm3 (l) into m³ recalculation factor;
$V_{(c.spec)}$—specific internal volume of casing under DPE, dm³/m,
$h_{(tub)}$—of pump or tubing suspension, m;
$h_{(c.b.)}$—depth of the current bottom-hole, m;
$V_{(c.tub)}$—specific internal volume of tubing, dm³/m,
$V_{(rod)}$—displacement of drill-rods, m³; (when ESP $V_{(rod)}$=0);
$V_{(AP)}$—volume of active pack, m³;
$V_{(well\ under\ DPE)}$—volume of well under DPE, m³;
$V_{(tub)}$—internal volume of tubing, m³;
1—reserve of volume of well-killing fluid for AP overflush, m³.

When overflushing the AP to the well bottom during well killing operation by direct injection method, it is recommended not to exceed the maximum pressure on the pump suspension, the pressure of column pressuring and the cable entry (as a rule, up to a maximum of 60 atm).

After installing of AP in bottom hole, the well kill operation is terminated by replacing the annular volume of the well fluid with the estimated volume of well-killing fluid:

$$V_{(repl.)}=0.001*V_{(an.spec)}*h_{(tub)}*1.5 \tag{11}$$

where:

$V_{(repl.)}$ is the volume of well-killing fluid injected into the tubing on circulation to replace annular fluid, m³;
0.001—dm³ (l) into m³ recalculation factor;
$V_{(an.spec)}$—specific volume of annular space, dm³/m;
$h_{(tub)}$—of pump or tubing suspension, m;
1.5—well-killing fluid margin for a full flushing with output of a clean well-killing solution at the wellhead.

Installation of AP when Killing of Well by Reverse Injection:

The first stage is injection of AP into the annular space and finishing up to the tubing bottom (or up to the pump suspension) on circulation with open tubing valve for displacement by the well-killing fluid in volume.

$$V_{(circ)}=V_{(an.)}-V_{(AP)} \tag{12}$$

where:

$V_{(circ)}$—volume of well-killing fluid, injected at opened valve, m³;
$V_{(an.)}$—volume of annular space up to the tubing bottom or to the pump suspension, m³;

$V_{(AP)}$—volume of active pack, m³;

The second stage is overflush of AP at the closed tubing valve by well-killing fluid in the volume:

$$V_{(flush)} = V_{(an.)} + V_{(well\ under\ DPE)} - V_{(AP)} + 1 \quad (13)$$

$$V_{(flush)} = 0.001 * V_{(an.spec)} * h_{(tub)-V(rod)} + 0.001 * V_{(c.spec)} * (h_{(c.b.)} - h_{(tub)}) - V_{(AP)} + 1 \quad (14)$$

where:

$V_{(flush)}$—volume of well-killing fluid, injected for overflush at closed tubing valve, m³;

0.001—dm³ (l) into m³ recalculation factor;

$V_{(an.spec)}$—specific internal volume of annular space, dm³/m;

$V_{(an.)}$—volume of annular space up to the tubing bottom or to the pump suspension, m³;

$h_{(tub)}$—of pump or tubing suspension, m;

$h_{(c.b.)}$—depth of the current bottom-hole, m;

$V_{(AP)}$—volume of active pack, m³;

$V_{(well\ under\ DPE)}$—volume of well under DPE, m³;

1—reserve of volume of well-killing fluid for AP overflush, m³.

When flushing the AP to the bottom hole by reverse injection method, it is recommended not to exceed the pressure of cable entry pressuring (as a rule, 80 atm), the pressure of casing string pressuring.

After installing the AP, the well is filled and flushed "up to clean" of the remaining volume (annular or tubular) with an aqueous solution of calcium chloride or potassium chloride with addition of hydrophobizator of "IVV-1" (ИBB-1) or "ChAS-M" (ЧAC-M) brands—1-2% by volume, then the annular and tubular valves should be closed, and the well should be leaved for equilibration for 1 hour. After that, the excess pressure is measured in the annulus and tubular space and, if necessary, equilibrated. Overpressure is drained through the process pipes to the holding tank.

The AP is considered to be installed in the specified interval when pumping the estimated amount of the well-killing fluid for delivery by elevator (in circulation mode), and by flushing the estimated amount of well-killing fluid when it is installed on the downhole (in flush mode). At the end of the flushing mode, it is possible to increase the wellhead pressure by 15-20 atm while landing the AP on the bottom-hole.

To prevent premature removal of AP from the BHZ during tripping operations on a well, killed with the use of AP, it is forbidden to exceed the limiting speed of lifting of underground downhole equipment.

Removal of Active Pack

It is recommended to remove AP by transferring the well to oil and causing inflow of fluids into the well. If there is no possibility of transferring the well to oil, it is allowed to remove AP by transferring the well to an aqueous solution of calcium chloride or potassium chloride with the addition of hydrophobizator of "IVV-1" (ИBB-1) or "ChAS-M" (ЧAC-M) brands—1-2% by volume and causing fluid flow into the well. Inflow into the well may be caused by classical methods of well development. It is not recommended to cause the inflow of liquid into the well by the start of ESP. Residues of AP in the hydrocarbon filtration channels are destroyed spontaneously during the inflow of well production during the first 24-hour period.

To remove the AP without invoking inflow from the formation, it is necessary to inject oil into the AP installation interval. Recommended oil consumption: volume 0.6-0.8 m³ per 1 m³ AP with overflush.

Laboratory Studies of Emulsion System Physical Properties

Samples with different volumetric contents of components were prepared to study the physical properties of emulsion system (ES).

As a result of the experiments, the following ES parameters were determined:

Density;
Aggregative stability;
Thermostability;
Kinematic viscosity.

After preparing the ES samples, they were held for at least 2 hours at room temperature prior to start of the experiments.

Study of Emulsion System Density

The results of measuring the ES density (psychometric method) with an aqueous component density of 1200 kg/m³ and 1100 kg/m³ are shown in tables at FIGS. 2 and 3.

Study of Emulsion System Aggregative Stability

Aggregative stability is the ability of ES to maintain the internal phase dispersity degree.

The evaluation was performed according to the index of electrostability—measurements of values of electric voltage corresponding to the moment of destruction of the ES enclosed between the electrodes of measuring cell of the device. The experiments were performed on FANN brand device.

The results of measuring the ES aggregative stability with an aqueous component density of 1200 kg/m³ are shown in table at FIG. 4.

Study of Emulsion System Thermostability

Measurement of the ES thermostability was performed by holding them in dimensional hermetically sealed cylinders in the oven for 24 hours at a specified temperature regime of 80° C. The test was considered positive (the sample is stable), if no more than 2% of the total ES volume of water or hydrocarbon phase was separated from the ES after 24 hours of thermostating. As a result of experiments on thermal stability, it was determined that all samples are stable for 24 hours.

Study of Emulsion System Kinematic Viscosity

The results of studies of the ES kinematic viscosity with an aqueous component density of 1200 kg/m³ are shown in the table at FIG. 5. The measurements were performed at a temperature of 20° C. (error of temperature measuring is ±0.1° C.) on VPZh-2 (ВПЖ-2) viscometer at viscometer constant of 0.09764. Prior to the experiments, the ES was stirred in a mechanical stirrer at a predetermined speed of 1500 rpm for 20 minutes.

The results of the complex of basic laboratory studies of the ES physical properties confirmed the high technological properties of the developed compound. Especially important parameters from the point of industrial application of the emulsion system (ES) are high thermal stability and aggregative stability, as well as the ability to regulate the ES viscosity properties, changing the volume fraction of the constituent components depending on the filtration-capacitive and geological-physical characteristics of bottom hole zone (BHZ).

EXAMPLES OF THE METHOD IMPLEMENTATION

Example 1

Implementation of the method in an oil well. Rate of water-cut prior killing the well—54%.

Preparatory work was performed at the well:

The well was stopped, discharged, checked for correctness the valves on its well head equipment. We checked the presence of circulation in the well and decided on the process liquids injection option-reverse injection. The value of current reservoir pressure was also determined. The well-killing equipment was arranged according to the approved scheme. The equipment was bundled and the downstream line was pressurized by pressure that exceeded the expected working by 1.5 times, observing safety measures. Downstream line was equipped with float valve.

Upon completion of the preparatory works, technological operations were started to kill the well.

At the first stage, ES was injected into BHZ in the volume of 2 m$^3$/meter of perforated bed formation thickness (m$^3$/m), and of the following composition, %: diesel fuel—15, emulsifier—2, colloidal solution of silicon dioxide nanoparticles—0.5, aqueous solution of potassium chloride with a density of 1100 kg/m$^3$—82.5. By doing so, the emulsifier contains (% by vol.): esters of higher unsaturated fatty acids (linoleic) and resin acids—40, amine oxide—0.7, high molecular weight organic heat stabilizer (suspension of lime in diesel fuel)—0.5, diesel fuel (summer)—58.8. Colloidal solution of silicon dioxide nanoparticles contains (% by vol.): amorphous silicon dioxide—30, propyleneglycol monomethyl ether—68.5, water—1.5.

At the second stage, aqueous solution of calcium chloride with IVV-1 (ИBB-1) hydrophobizer (1% by weight) of 1085 kg/m$^3$ density in a volume of 34 m$^3$ was injected into BHZ.

The well was killed in one cycle without complications. Rate of water-cut after bringing the well on to stable production—48%, average after three months of the well operation—51%.

Example 2

Here and further preparatory work was performed in accordance with the procedure specified in Example 1.

Implementation of the method by direct injection in an oil well. Rate of water-cut prior killing the well—78%.

At the first stage, ES was injected into BHZ in the volume of 1.7 m$^3$/meter of the following composition, %: diesel fuel—16, emulsifier—2.3, colloidal solution of silicon dioxide nanoparticles—0.7, an aqueous solution of potassium chloride with a density of 1100 kg/m$^3$—81. By doing so, the emulsifier contains (% by vol.): esters of higher unsaturated fatty acids (linoleic) and resin acids—41, amine oxide—0.9, high molecular weight organic heat stabilizer (slurry of lime in diesel fuel)—0.7, diesel fuel (summer)—57.4. Colloidal solution of silicon dioxide nanoparticles contains (% by vol.): amorphous silicon dioxide—30.5, propyleneglycol monomethyl ether—69% by vol., water—0.5% by vol.

At the second stage, aqueous solution of calcium chloride with IVV-1 (ИBB-1) hydrophobizer (1% by weight) of 1065 kg/m$^3$ density in a volume of 27 m$^3$ was injected into the well.

The well was killed in one cycle without complications. Rate of water-cut after bringing the well on to stable production—70%, average after three months of the well operation—73%.

Example 3

Implementation of the method by reverse injection in an oil well. Rate of water-cut prior killing the well—47%.

At the first stage, ES was injected into BHZ in the volume of 3.3 m$^3$/meter of the following composition, %: diesel fuel—20, emulsifier—2.0, colloidal solution of silicon dioxide nanoparticles—1, aqueous solution of potassium chloride with a density of 1200 kg/m$^3$—76.5. By doing so, the emulsifier contains (% by vol.): esters of higher unsaturated fatty acids (linoleic) and resin acids—42, amine oxide—1, high molecular weight organic heat stabilizer (bentonite suspension in diesel fuel)—0.8, diesel fuel (summer)—56.2. Colloidal solution of silicon dioxide nanoparticles contains (% by vol.): amorphous silicon dioxide—31.5, propyleneglycol monomethyl ether—68, water—0.5.

At the second stage, aqueous solution of calcium chloride with IVV-1 (ИBB-1) hydrophobizer (2% by vol.) of 1140 kg/m$^3$ density in a volume of 38 m$^3$ was injected into the well.

The well was killed in one cycle without complications. Rate of water-cut after bringing the well on to stable production—39%, average after three months of the well operation—42%.

Example 4

Implementation of the method by direct injection in a gas well. The well was killed in one cycle without complications.

At the first stage, ES was injected into BHZ in the volume of 4 m$^3$/meter of the following composition, %: diesel fuel—25, emulsifier—2.5, colloidal solution of silicon dioxide nanoparticles—1, water solution of potassium chloride with a density of 1100 kg/m$^3$—71.5. By doing so, the emulsifier contains (% by vol.): esters of higher unsaturated fatty acids (oleic) and resin acids—42, amine oxide—1, high molecular weight organic heat stabilizer (lime suspension in diesel fuel)—1, diesel fuel (winter)—56. Colloidal solution of silicon dioxide nanoparticles contains (% by vol.): amorphous silicon dioxide—32.5, propyleneglycol monomethyl ether—67, water—0.5.

At the second stage, aqueous solution of potassium chloride with ChAS-M (ЧAC-M) hydrophobizer (2% by vol.) of 1085 kg/m$^3$ density in a volume of 40 m$^3$ was injected into the well.

Example 5

Implementation of the method by direct injection in a gas well. The well was killed in one cycle without complications.

At the first stage, ES was injected into BHZ in the volume of 4.5 m$^3$/meter of the following composition, %: diesel fuel—27, emulsifier—3, colloidal solution of silicon dioxide nanoparticles—1, water solution of potassium chloride with the density of 1110 kg/m$^3$—69. By doing so, the emulsifier contains (% by vol.): esters of higher unsaturated fatty acids (oleic) and resin acids—42, amine oxide—1, high molecular weight organic heat stabilizer (suspension of bentonite in diesel fuel)—1, diesel fuel (winter)—56. Colloidal solution of silicon dioxide nanoparticles contains (% by vol.): amorphous silicon dioxide—32.5, propylene glycol monomethyl ether—67, water—0.5.

At the second stage, aqueous solution of potassium chloride with ChAS-M (ЧАС-М) hydrophobizer (2% by weight) of 1090 kg/m$^3$ density in a volume of 36 m$^3$ was injected into the well.

Example 6

Implementation of the method by reverse injection in an oil well. Rate of water-cut prior killing the well—39%.

At the first stage, ES was injected into BHZ in the volume of 2 m$^3$/meter of the following composition, %: diesel fuel—30, emulsifier—3, colloidal solution of silicon dioxide nanoparticles—1, water solution of potassium chloride with density of 1180 kg/m$^3$—66. By doing so, the emulsifier contains (% by vol.): esters of higher unsaturated fatty acids (oleic) and resin acids—42, amine oxide—1, high molecular weight organic heat stabilizer (lime suspension in diesel fuel)—1, diesel fuel (winter)—56. Colloidal solution of silicon dioxide nanoparticles contains (% by vol.): amorphous silicon dioxide—31.5, propyleneglycol monomethyl ether—68, water—0.5.

At the second stage, aqueous solution of potassium chloride with IVV-1 (ИВВ-1) hydrophobizer (2% by weight) of 1085 kg/m$^3$ density in a volume of 40 m$^3$ was injected into the well.

The well was killed in one cycle without complications. Rate of water-cut after bringing the well on to stable production—35%, average after three months of the well operation—37%.

Example 7

Implementation of the method by reverse injection in an oil well. Rate of water-cut prior killing the well—65%.

At the first stage, ES was injected into BHZ in the volume of 3.6 m$^3$/meter of the following composition, %: diesel fuel—30, emulsifier—3, colloidal solution of silicon dioxide nanoparticles—1, aqueous solution of potassium chloride with a density of 1200 kg/m$^3$—66. By doing so, the emulsifier contains (% by vol.): esters of higher unsaturated fatty acids (oleic) and resin acids—40, amine oxide—0.7, high molecular weight organic heat stabilizer (slurry of lime in diesel fuel)—0.5, diesel fuel (winter)—58.8. Colloidal solution of silicon dioxide nanoparticles contains (% by vol.): amorphous silicon dioxide—30.5, propyleneglycol monomethyl ether—68.5, water—1.

At the second stage, aqueous solution of potassium chloride with IVV-1 (ИВВ-1) hydrophobizer (2% by weight) of 1160 kg/m$^3$ density in a volume of 46 m$^3$ was injected into the well.

The well was killed in one cycle without complications. Rate of water-cut after bringing the well on to stable production—59%, average after three months of the well operation—57%.

Example 8

Implementation of the method by reverse injection in an oil well. Rate of water-cut prior killing the well—32%.

At the first stage, ES was injected into BHZ in the volume of 2.7 m$^3$/meter of the following composition, %: diesel fuel—30, emulsifier—3, colloidal solution of silicon dioxide nanoparticles—1, water solution of potassium chloride with density of 1160 kg/m$^3$—66. By doing so, the emulsifier contains (% by vol.): esters of higher unsaturated fatty acids (linoleic) and resin acids—40, amine oxide—0.7, high molecular weight organic heat stabilizer (suspension of lime in diesel fuel)—0.5, diesel fuel (summer)—58.8. Colloidal solution of silicon dioxide nanoparticles contains (% by vol.): amorphous silicon dioxide—32.5, propyleneglycol monomethyl ether—67, water—0.5.

At the second stage, aqueous solution of potassium chloride with IVV-1 (ИВВ-1) hydrophobizer (2% by vol.) of 1100 kg/m$^3$ density in a volume of 44 m$^3$ was injected into the well.

The well was killed in one cycle without complications. Rate of water-cut after bringing the well on to stable production—28%, average after three months of the well operation—26%.

Example 9

Implementation of the method by reverse injection in an oil well. Rate of water-cut prior killing the well—41%.

At the first stage, ES was injected into BHZ in the volume of 3, 1 m$^3$/meter of the following composition, %: treated oil from an oil preparation and pumping station—27, emulsifier—2.5, colloidal solution of silicon dioxide nanoparticles—0.8, aqueous solution of potassium chloride with a density of 1130 kg/m$^3$—69.7. By doing so, the emulsifier contains (% by vol.): esters of higher unsaturated fatty acids (linoleic) and resin acids—42, amine oxide—0.7, high molecular weight organic heat stabilizer (bentonite suspension in diesel fuel)—0.5, diesel fuel (summer)—42.2. Colloidal solution of silicon dioxide nanoparticles contains (% by vol.): amorphous silicon dioxide—30, propyleneglycol monomethyl ether—69, water—1.

At the second stage, aqueous solution of potassium chloride with IVV-1 (ИВВ-1) hydrophobizer (1.5% by vol.) of 1100 kg/m$^3$ density in a volume of 47 m$^3$ was injected into the well.

The well was killed in one cycle without complications. Rate of water-cut after bringing the well on to stable production—35%, average after three months of the well operation—33%.

Example 10

Implementation of the method by reverse injection in an oil well. Rate of water-cut prior killing the well—53%.

At the first stage, ES was injected into BHZ in the volume of 4 m$^3$/meter of the following composition, %: treated oil from an oil preparation and pumping station—25, emulsifier—2.5, colloidal solution of silicon dioxide nanoparticles—0.5, an aqueous solution of potassium chloride of density 1200 kg/m$^3$—72. By doing so, the emulsifier contains (% by vol.): esters of higher unsaturated fatty acids (linoleic) and resin acids—40, amine oxide—0.7, high molecular weight organic heat stabilizer (bentonite suspension in diesel fuel)—0.5, diesel fuel (summer)—58.8. Colloidal solution of silicon dioxide nanoparticles contains (% by vol.): amorphous silicon dioxide—31.5, propylene glycol monomethyl ether—68, water—0.5. At the second stage, aqueous solution of potassium chloride with ChAS-M (ЧАС-М) hydrophobizer (1.5% by weight) of 1180 kg/m$^3$ density in a volume of 42 m$^3$ was injected into the well.

The well was killed in one cycle without complications. Rate of water-cut after bringing the well on to stable production—50%, average after three months of the well operation—48%.

Example 11

Implementation of the method by reverse injection in an oil well. Rate of water-cut prior killing the well—77%.

At the first stage, ES was injected into BHZ in the volume of 3.3 m³/meter of the following composition, %: treated oil from an oil preparation and pumping station—25, emulsifier—2.5, colloidal solution of silicon dioxide nanoparticles—0.7, an aqueous solution of potassium chloride of density 1180 kg/m³—71.8. By doing so, the emulsifier contains (% by vol.): esters of higher unsaturated fatty acids (linoleic) and resin acids—42, amine oxide—0.9, high molecular weight organic heat stabilizer (bentonite suspension in diesel fuel)—0.8, diesel fuel (winter)—56.3. Colloidal solution of silicon dioxide contains (% by vol.): amorphous silicon dioxide—32, propyleneglycol monomethyl ether—67.5, water—0.5.

At the second stage, aqueous solution of potassium chloride with ChAS-M (ЧAC-M) hydrophobizer (2% by weight) of 1150 kg/m³ density in a volume of 36 m³ was injected into the well.

The well was killed in one cycle without complications. Rate of water-cut after bringing the well on to stable production—73%, average after three months of the well operation—71%.

Thus, the invention provides an increase in the efficiency of geological and technical operations for killing oil and gas wells, high thermal stability and aggregative stability of the emulsion system for killing wells, as well as the ability to regulate the surface-active properties and viscosity of the emulsion system depending on the filtration-capacitive and geological-physical characteristics of bottom-hole formation zone.

The invention claimed is:

1. A method of killing oil and gas wells, comprising:
sequentially injecting an active pack and a displacement fluid into a bottom-hole formation zone, wherein:
the active pack is an emulsion system containing:
15-30 vol. % of a diesel fuel or a treated oil from an oil preparation and pumping station, 2-3 vol. % of an emulsifier, 0.5-1 vol. % of a colloidal solution of hydrophobic silicon dioxide nanoparticles, and a remainder of the emulsion system comprising an aqueous solution of calcium chloride or potassium chloride;
the emulsifier contains 40-42 vol. % of esters of higher unsaturated fatty acids and resin acids, 0.7-1 vol. % of amine oxide, 0.5-1 vol. % high molecular weight organic heat stabilizer, and a remainder of the emulsifier comprises a diesel fuel; and
the colloidal solution of hydrophobic silicon dioxide nanoparticles contains 31-32.5 vol. % of amorphous silicon dioxide nanoparticles, 67-69 vol. % of propylene glycol monomethyl ether, and a remainder of the colloidal solution comprising water; and
the displacement fluid contains an aqueous solution of calcium chloride or potassium chloride with an addition of a water-alcohol mixture of quaternary ammonium salts of alkyl dimethylamine or a mixture of alkyl dimethylbenzylammonium chloride and a tertiary amine quaternary ammonium salt.

* * * * *